United States Patent [19]

Locklear et al.

[11] Patent Number: 5,373,138
[45] Date of Patent: Dec. 13, 1994

[54] LASER MARKING OF MOLDED HAND GRIPS

[75] Inventors: Tony Locklear, Maxton; Dennis C. Wyckoff, Laurinburg, both of N.C.

[73] Assignee: Eaton Corporation, Cleveland, Ohio

[21] Appl. No.: 111,166

[22] Filed: Aug. 24, 1993

Related U.S. Application Data

[63] Continuation of Ser. No. 868,807, Apr. 15, 1992, Pat. No. 5,239,158.

[51] Int. Cl.$^5$ ............................................. B23K 26/00
[52] U.S. Cl. ................................................. 219/121.69
[58] Field of Search ......................... 219/121.65, 121.66, 219/121.68, 121.69; 174/112; 346/76 L

[56] References Cited

U.S. PATENT DOCUMENTS

| | | | |
|---|---|---|---|
| 4,469,930 | 9/1984 | Takahashi | 219/121.72 |
| 4,516,496 | 5/1985 | Giori | 101/152 |
| 4,564,737 | 1/1986 | Burke et al. | 219/121.68 |
| 4,997,994 | 3/1991 | Andrews et al. | 194/112 |

OTHER PUBLICATIONS

"Product Marking With ND: YAG and CO$_2$ Lasers", by M. J. Weiner, SPIE, vol. 86, pp. 23–29, Industrial Application of High Power Laser Technology, 1976.
"Neodymium yttrium aluminum garnet (Nd: YAG) Laser marking system", by Ronald L. Hansen, SPIE, vol. 247, pp. 18–23; Advances in Laser Engineering & Appl.; 1980.

*Primary Examiner*—C. L. Albritton
*Attorney, Agent, or Firm*—Brooks & Kushman

[57] ABSTRACT

A method is provided for marking a molded hand grip such as a golf grip (100) with specialized information such as a personalized signature. The method utilizes a laser marking device (50) that is operative to provide an optical beam (8) having power and optical wave length characteristics effective to vaporize a continuous groove or trench and/or adjacently positioned dots in a target region ("R") on the hand grip to which beam (8) is exposed, The marked grip is then removed from device (50) and a selected colorant (16) such as paint or ink of desired color is then deposited in the marking that is preferably bondable to the desired extent to the material from which the hand grip is molded after which any excess colorant is then removed to provide the finished hand grip having the specialized information marked thereon.

8 Claims, 1 Drawing Sheet

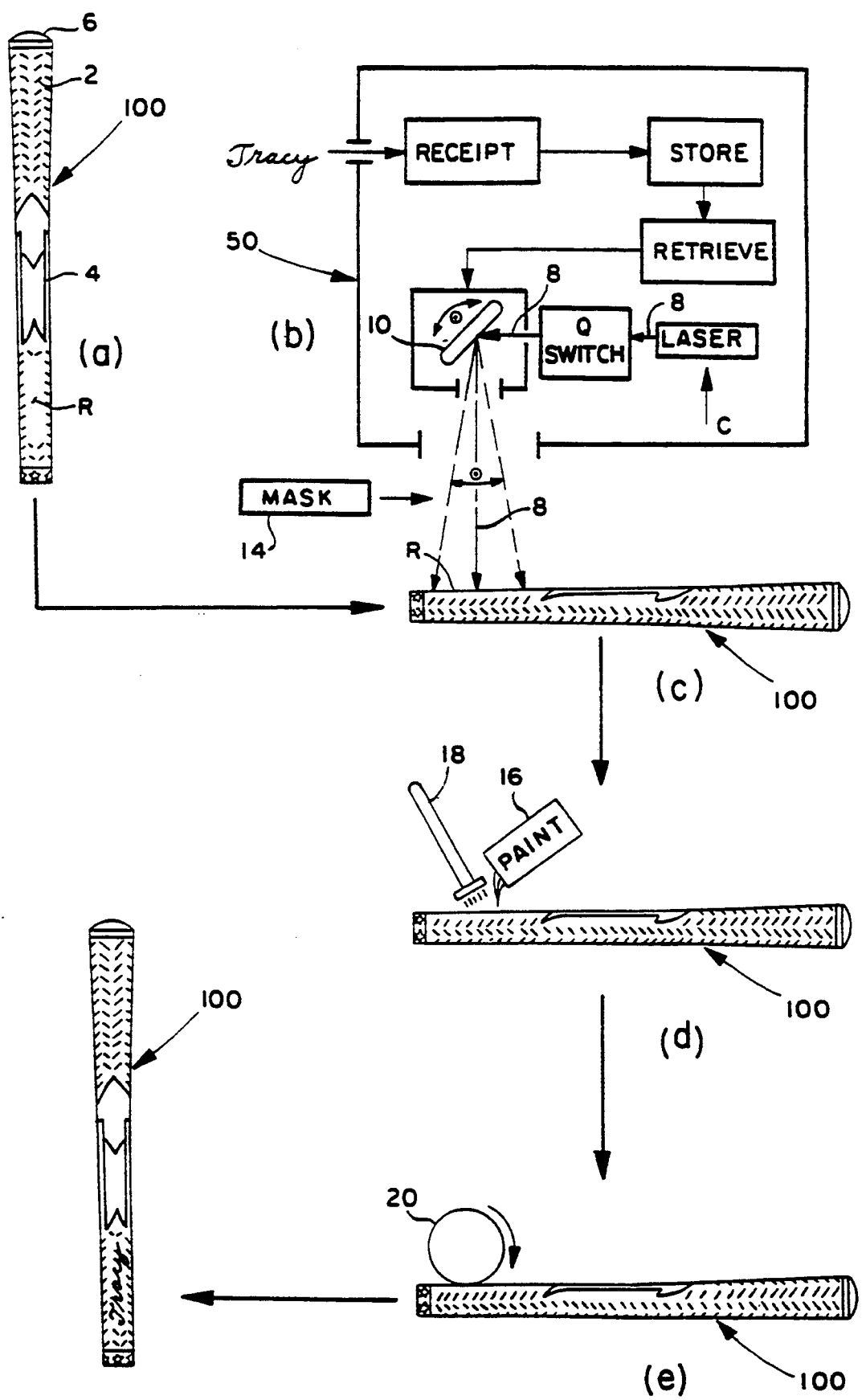

LASER MARKING OF MOLDED HAND GRIPS

This is a continuation of application Ser. No. 868,807 filed on Apr. 15, 1992, now U.S. Pat. No. 5,239,158.

This invention relates generally to a method for marking molded hand grips and more particularly to a method for laser marking already molded hand grips with specialized information such as insignia, logomarks, brand names, personalized signatures and the like.

BACKGROUND OF THE INVENTION

Many hand grips and most golf hand grips are currently being made by a molding process and any design or marking desired on the outside of the grip must be designed into the mold so that the marking is in the form of a depression or groove in the resultant molded product outer surface into which a suitable paint is then characteristically applied with any excess being removed such as by wiping, buffing or sanding.

Such process however, would be extremely costly .and limited in versatility in cases where individualized marking is desired since special molds would have to be made to satisfy individual customer request.

Surprisingly, no one prior to the present invention had thought to utilize laser technology for marking specialized information on already molded hand grips so that either or both the manufacturer and distributor could provide such specialized marking in response to individual customer request.

Although laser marking devices have been available in the market place for many years, they have not heretofor been employed to mark information on already molded hand grips.

Informative descriptions of commercially available laser devices can be found for example in "Proceedings of the Society of Photo-Optical Instrumentation Engineers" (SPIE) in Volume 86, pp. 23-29, 1976, in an article by M. J. Weiner entitled "PRODUCT MARKING WITH NA: YAG and $CO_2$ LASERS" and in Volume 247, pp. 18-23, 1980 in an article by Ronald L. Hansen entitled "EODYMIUM YTTRIUM ALUMINUM GARNET (Nd: YAG) LASER MARKING SYSTEMS".

Although the above described SPIE articles are replete with information concerning electronic circuitry associated with the respective devices and their ability to mark by vaporizing adjacently positioned dots or continuous grooves or tunnels in metal, plastic and rubber materials, no one heretofor had thought to apply such laser technology to mark already molded hand grips with personalized information such as insignia, brand names, logomarks, signatures and the like which would otherwise be extremely impracticable where such had to be accomplished by engraving the molds.

An example of a laser cutting device for tape controled cutting is disclosed in U.S. Pat. No. 4,469,930, the disclosure of which is incorporated herein by reference. An example where a laser device is used to engrave printing copper plate is disclosed in U.S. Pat. No. 4,516,496, the disclosure of which is incorporated herein by reference. An example of laser cutting tire treads in blank prototype blocks is disclosed in U.S. Pat. No. 4,564,737, the disclosure of which is incorporated herein by reference.

None of the above patents however, singularly or in any combination with the above described SPIE articles disclose or suggest the marking method of the present invention.

SUMMARY OF THE INVENTION

Accordingly, it is an object of this invention to provide a method for marking information on an already molded hand grip.

It is another object of this invention to mark an already molded hand grip with personalized information such as insignia, brand names, logomarks, personalized signatures and the like.

It is a more particular object of this invention to provide a method employing a laser device for marking information on already molded hand grips.

BRIEF DESCRIPTION OF THE DRAWINGS

FIG. 1 is a block diagram of a preferred embodiment of the method of the invention for marking hand grips.

DESCRIPTION OF SOME PREFERRED EMBODIMENTS

A molded hand grip in the form of a golf hand grip 100 is provided in step (a) of FIG. 1. Golf grip 100 also is a molded grip that is to be marked by the method of the present invention.

Golf grip 100 has designs such as Chevrons 2 and the arrow 4 molded into its outer surface for common distribution in the market place. Golf grip 100 has an end cap 6 secured to its end that itself may contain markings for common distribution in the market place.

Golf grip 100 also has a region referenced by the letter "R" that is the target region to be marked with specialized information by the method of the invention.

Golf grip 100 is molded from a laser vaporizable material that is vaporized by a laser marking device 50 such as shown in step (b) of FIG. 1. Golf grip 100 is preferably molded from a material selected from the group of materials consisting of thermoplastic elastomers and rubber materials having durometer and toughness and gripping characteristics attractive for conditions under which the game of golf is apt to be played.

Examples of thermoplastic elastomers suitable for golf hand grips include lower durometer block copolymers sold under the "KRATON" trademark by Shell Chemical Company. Rubber compositions suitable for golf grips applications include natural rubber, synthetic polymers or combinations of both compounded with plasticizers, stabilizers, U.V. inhibitors and other additives well known to those skilled in the art of rubber hand grip materials.

A laser marking device 50 is provided in step (b) in FIG. 1 as previously described. Device 50 is operative to provide an optical beam having power and optical wave length characteristics effective to vaporize the selected hand grip material in a marking form having the breadth and depth desired.

Device 50 is operative to receive and mark specialized information on a target region exposed to the laser beam of which the personalized signature "Tracy" is an illustrative example.

The information to be marked may be received by device 50 in a variety of forms such as by typing or by means of tape or by means of a parallel stylus marking system by which the laser beam tracks the stylus movement as directed by intermediate electro-mechanical interconnections.

Device 50 may for example be of the programmable type that stores the information to be marked on the hand grip in memory which is then retrieved in response to a command signal that is referenced in step (b) by the numeral "C".

As shown in step (b) of FIG. 1, when the laser is activated by command signal "C", a laser optical beam 8 is produced that impinges upon a reflective optical positioner 10 that is operable to move in at least the plane perpendicular to the beam to provide the marking desired by vaporizing a continuous groove or trench having the breadth and depth desired in the target material to which the laser beam 8 is exposed.

Device 50 may include a "Q" switch that is operative to turn laser beam 8 on and off at a selected rate to create a pulsed signal that in combination with either the beam movement in the plane perpendicular to the beam creating what is known in the laser marking trade as "dots" that are adjacently positioned and are used in many marking applications.

In some instances, the marking device may provide a stationary optical beam 8 and the target itself is caused to traverse across the beam in a manner operative to enable the beam to mark the product with the desired information.

In yet another variation, a mask 14 having the information to be marked cut therethrough may be inserted between laser beam 8 and the target region such that the beam casts an image of the information to be marked on the target and which then proceeds to vaporize the material beneath the image to the breadth and depth desired.

In yet a further variation, the marking produced by the laser device may be a combination of both a continuous groove or trench and adjacently positioned dots.

Thus, numerous variations may be employed to laser mark a target region such as region "R" of golf grip 100 exposed to laser beam 8 in step (c) with information desired such as by traversing the optical beam across the target region or by traversing the target region across the optical beam or by traversing both the beam and the target relative the other either continuously to mark the target region material with a continuous groove or trench or by employing a "Q" switch or equivalent operative to pulse the laser beam to mark the target region material with adjacently positioned dots in a manner providing the marking desired.

The laser produced dots and/or grooves providing the marked information created in step (c) are then at least partially filled with a selected colorant in step (d) such as a paint or ink in contrasting color to the color of golf grip 100 by means such as paint brush 18. Colorant 16 has the desired color and is preferably bondable to the extend desired to the selected material for which golf grip 100 is molded.

Any excess colorant in the marked target region of golf grip 100 is then removed such as by wiping and/or sanding, and/or buffing the surface of region "R" such as illustrated by rotary buffing wheel 20 in step (e) of FIG. 1 that then provides the resulting golf grip 100 having the personalized signature "Tracy" marked thereon.

What is claimed is:

1. A hand grip marked after being molded with personalized information by a method comprising:
   providing the hand grip already molded from a selected laser vaporizable material and having a region thereon to be marked;
   exposing the hand grip region to an optical beam of a laser marking device operative to provide an optical beam having power and optical wavelength characteristics effective to vaporize the selected material in a marking form having the breadth and depth desired and having means for receiving the information to be marked and for causing the optical beam to mark the region in the marking form desired upon activation of the optical beam in response to a command signal; and
   initiating the command signal and marking the personalized information on the hand grip region, the method being done after the hand grip is molded and before the hand grip is usable as a personalized hand grip.

2. The hand grip of claim 1, the method further comprising:
   depositing a selected colorant into the laser marking; and
   removing any excess of the colorant from the region of the hand grip.

3. A molded hand grip marked after being molded with personalized information by a method comprising:
   providing the hand grip already molded from a selected laser vaporizable material and having a region thereon to be marked;
   exposing the hand grip region to an optical beam of a laser marking device operative to provide an optical beam having power and optical wavelength characteristics effective to vaporize the selected material in a marking form having the breadth and depth desired and having means for receiving the information to be marked and for causing the optical beam to mark the region in the marking form desired upon activation of the optical beam in response to a command signal;
   initiating the command signal and marking the information on the hand grip region exposed thereto;
   depositing a selected colorant into the laser marking; and
   removing any excess of the colorant from the surface of the hand grip region having the laser marking thereon, the method being done after the hand grip is molded and before the hand grip is usable as a personalized hand grip.

4. A substantially hollow hand grip already molded from a selected laser vaporizable material, the hand grip having a region thereon marked after molding with personalized information by a laser marking device operative to produce an optical beam having power and optical wavelength characteristics effective to vaporize the selected material in a marking form after molding and before useable as a hand grip.

5. A substantially hollow hand grip already molded from a selected laser vaporizable material, the hand grip having a region thereon marked after molding with personalized information by or for an end user utilizing a laser marking device operative to produce an optical beam having power and optical wavelength characteristics effective to vaporize the selected material in a marking form having a desired depth after molding and before useable as a personalized hand grip, the laser marking being at least partially filled with a colorant.

6. The hand grip of claim 1 wherein the hand grip is a golf grip.

7. The hand grip of claim 4 wherein the hand grip is a golf grip.

8. The hand grip of claim 5 wherein the hand grip is a golf grip.

* * * * *